United States Patent Office 3,409,606
Patented Nov. 5, 1968

3,409,606
HALOGENATED CHLOROIMIDAZOLE COMPOUNDS
Albert William Lutz, Montgomery Township, Somerset County, and Sylvio Andrew De Lorenzo, Trenton, N.J., assignors to American Cyanamid Company, Stamford, Conn., a corporation of Maine
No Drawing. Filed Dec. 30, 1965, Ser. No. 517,840
7 Claims. (Cl. 260—157)

ABSTRACT OF THE DISCLOSURE

Chlorinated imidazole compounds are provided having the formula:

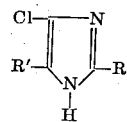

wherein R is hydrogen, halogen, lower alkyl or phenylazo and R′ is hydrogen or halogen, provided that when R is chloro, R′ is halogen. A process is provided for producing these compounds by the reaction of an imidazole with sodium hypochlorite in a basic medium. The compounds are suitable for use as herbicides.

---

This invention relates to novel chlorinated imidazoles, a method for preparing the same, and to a method of controlling undesirable plant species with said imidazoles. More particularly, this invention relates to novel compounds of the formula:

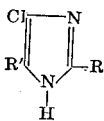

(I)

wherein R is a member selected from the group consisting of hydrogen, halogen, lower alkyl ($C_1$–$C_4$) and phenylazo and R′ is selected from the group consisting of hydrogen and halogen, provided that when R is chloro R′ is halogen; to a process for preparing said compositions, and to the use of said compositions for controlling undesirable plant species. Halogen in the above formula includes chlorine, bromine, iodine and fluorine. The compounds of the invention also include the tautomers of compounds of Formula I as well as the salts, particularly acid addition salts, of the Formula I compounds and tautomers.

Bromination and iodination of imidazoles and imidazole compounds are well known in the literature, but successful ring chlorination of imidazoles lacking substitution on the imino nitrogen atom has not been reported previously. Attempts to chlorinate such rings with molecular chlorine results in deep seated changes in the molecule represented by the introduction of groups such as carbonyl. Those instances of a chlorinated imidazole shown in the literature have always been N - alkylated imidazoles resulting from a cyclization reaction, e.g., sym-dimethyloxamide and phosphorus pentachloride heated together give N - methyl - 5 - chloroimidazole (chloroxalmethylin). Similarly, the reaction of phosphorus pentachloride on certain acylated derivatives of glycine will give compounds such as N - ethyl - 2 - phenyl-5-chloroimidazole.

It is therefore surprising to discover that ring chlorination of imidazoles and imidazole compounds lacking N - substitution can be achieved. We have found that compounds of Formula I above can be prepared by a rather simple yet unique process.

Briefly, the process of the invention is the reaction of imidazole, 4 - bromoimidazole or a 2 - lower alkyl substituted imidazole with an alkali metal hypochlorite in a basic medium followed by pH adjustment to between about 6 and 2 to form the corresponding 4,5 - dichloroimidazole; 2,4,5 - trichloroimidazole; 4 - bromo - 5-chloroimidazole; or 4,5 - dichloro - 2 - lower alkylimidazole. In the process potassium hypochlorite, calcium hypochlorite, or sodium hypochlorite may be employed; however, in the preferred embodiment, sodium hypochlorite is the reagent of choice. The pH adjustment is made with any effective acidification agent including mineral acids and acid generating materials; concentrated hydrochloric acid is preferred. When imidazole is used in the above reaction, it is found that at a pH of about 6 a major portion of the 4,5-dichloroimidazole is isolated, while at about pH 2 a quantity of the 2,4,5 - trichloroimidazole is recovered. Following preparation, 4,5 - dichloroimidazole is treated with an alkali metal hydroxide and reacted with bromine or iodine in chloroform or other suitable inert solvent to yield the 2 - bromo or 2-iodo - 4,5 - dichloroimidazole. The 4,5 - dichloroimidazole may also be dissolved in ethyl ether or other suitable inert solvent and treated with hydrogen chloride to form the hydrochloride salt of said compound or it may be admixed with ammonium hydroxide and this solution reacted with a benzenediazonium reagent prepared from aqueous potassium nitrite and aniline in the presence of a strong mineral acid to yield the 4,5-dichloro-2-phenylazoimidazole.

In yet another synthesis step the 4(5) - bromo - 5(4)-chloroimidazole, prepared as described above, is admixed with aqueous alkali metal hydroxide and reacted with bromine dissolved in chloroform or other suitable inert solvent and the pH of the solution adjusted to about 2 with hydrochloric acid to yield 2,4(5) - dibromo - 5(4)-chloroimidazole. 4(5) - bromo - 5(4) - chloroimidazole may also be refluxed with sodium sulfite, then treated with hydrogen chloride followed by treatment with alkali metal carbonate to produce the 4(5)-chloroimidazole.

Graphically the above reactions may be shown as follows:

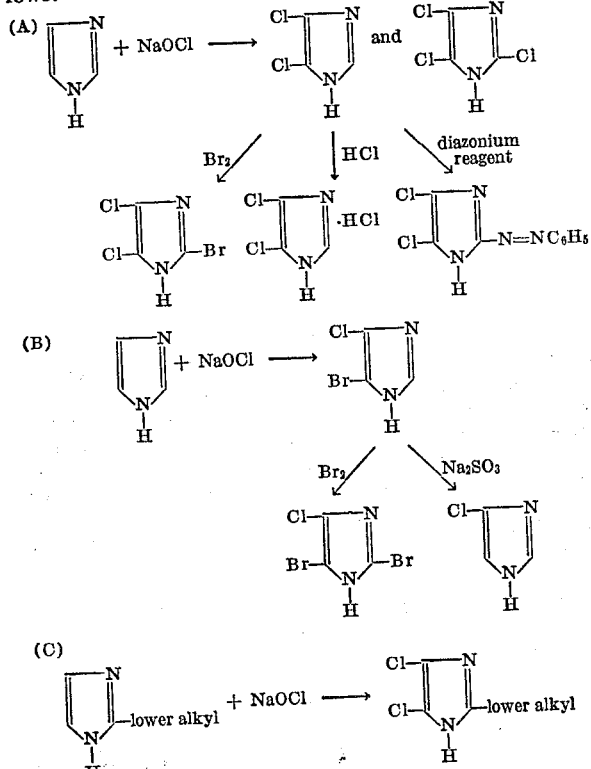

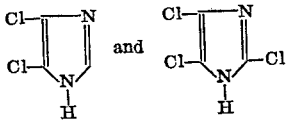

We have found that the compounds of the invention are highly active preemergence and postemergence herbicides. They may be applied in liquid sprays to the foliage of plants or the soil containing seeds of plants sought to be controlled. They may also be applied as solids in dust and granular formulations with conventional application equipment.

The examples set forth below are intended to further illustrate but not to limit the invention.

EXAMPLE 1

Preparation of 4,5-dichloroimidazole and 2,4,5-trichloroimidazole

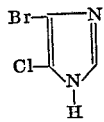

To a solution of sodium hypochlorite (5.25%, 10.5 liters) maintained at 15° C. is added all at once a solution of imidazole (250 grams, 3.68 moles) in one liter of water. The temperature of the solution rises to 46° C. and the color becomes orange-brown. After adjustment of the pH of the solution to 6 with 400 milliliters of concentrated hydrochloric acid, the solution is chilled and a precipitate is formed which is collected, washed, and dried in a vacuum oven at 50° C. to give 308 grams (61%) of 4,5-dichloroimidazole.

The filtrate from the above separation upon acidification to pH 2 (150 milliliters hydrochloric acid) and standing for two days deposits 54 grams crude 2,4,5-trichloroimidazole.

The dichloroimidazole is purified by reprecipitation from 2 N ammonium hydroxide (carbon) to give a white solid with melting point 178–180° C. Elemental analysis and its nuclear magnetic resonance and infrared spectra support the assigned structure.

The crude trichloroimidazole is fractionally precipitated from 2 N ammonium hydroxide (carbon). The fraction which precipitates at pH 2 has a melting point of 210–211° C. and after recrystallization from water has a melting point of 195–196° C. Elemental analysis and its nuclear magnetic resonance and infrared spectra are consistent with the assigned structure.

EXAMPLE 2

Preparation of 4(5)-bromo-5(4)-chloroimidazole

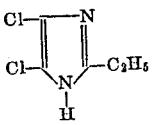

To a solution of 4-bromoimidazole (35.0 grams, 0.24 mole) in 240 milliliters of N sodium hydroxide is added all at once with stirring 355 milliliters of 5.3% sodium hypochlorite solution (0.25 mole). The temperature rises to 40° C. and the solution becomes orange. After carbon treatment, the solution is adjusted to pH 3. The solids are collected, washed with water, and dried to give 35.0 grams (81%) of crude product. Recrystallization from water gives the product with a melting point of 189–190° C.

*Analysis.*—Calculated for $C_3H_2BrClN_2$: C, 19.86; H, 1.11; N, 15.44; Cl, 19.55; Br, 44.04. Found: C, 19.63; H, 1.04; N, 15.25; Cl, 19.74; Br, 43.95.

EXAMPLE 3

Preparation of 2-ethyl-4,5-dichloroimidazole

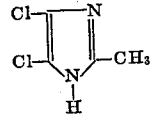

To a solution of 2-ethylimidazole (10.0 grams, 0.10 mole) in 100 milliliters of N sodium hydroxide is added all at once with stirring 296 milliliters of 5.3% sodium hypochlorite solution (0.21 mole). The pH of the solution is adjusted to 4 and the precipitated solids are collected and dried to give 10.0 grams (58%) of crude product. Two recrystallizations from water containing carbon gives a white product with melting point 170–171° C.

*Analysis.*—Calculated for $C_5H_6Cl_2N_2$: C, 36.40; H, 3.66; N, 16.98; Cl, 42.96. Found: C, 36.56; H, 3.30; N, 17.09; Cl, 42.94.

EXAMPLE 4

Preparation of 4,5-dichloro-2-methylimidazole

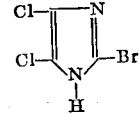

2-methylimidazole is reacted with sodium hypochlorite solution substantially as described in Example 3 above to give the named compound with a melting point of 251–252° C.

EXAMPLE 5

Preparation of 2-bromo-4,5-dichloroimidazole

To a solution of 1.36 grams (0.01 mole) of 4,5-dichloroimidazole, prepared in accordance with the procedure of Example 1, in 10 milliliters of N sodium hydroxide is added with stirring in dropwise manner a solution of 1.60 grams (0.01 mole) of bromine in 10 milliliters of chloroform. After separating the two phases, the aqueous phase is acidified to pH 4. A brown solid is precipitated which after drying weighs 1.63 grams (76%). Recrystallization from water:ethanol (50:50) mixture containing carbon gives a white product with melting point 219–220° C.

*Analysis.*—Calculated for $C_3HBrCl_2N_2$: C, 16.75; H, 0.47; N, 12.98; Cl, 32.85; Br, 37.05. Found: C, 16.80; H, 0.55; N, 13.09; Cl, 32.90; Br, 36.76.

EXAMPLE 6

Preparation of 4,5-dichloroimidazole hydrochloride

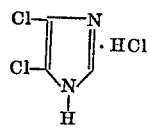

4,5-dichloroimidazole, prepared in accordance with Example 1, is dissolved in ethyl ether and treated with hydrogen chloride. The hydrochloride salt precipitates, is filtered, collected, and recrystallized from ethanol to give the above-named product having a melting point of 226–228° C.

EXAMPLE 7

Preparation of 4(5)-chloroimidazole

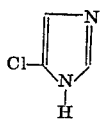

15.0 grams (0.0825 moles) of 4(5)-bromo-5(4)-chloroimidazole, prepared in accordance with the procedure of Example 5, is refluxed for 20 hours in 200 milliliters of water containing 20.0 grams (0.158 mole) of sodium sulfite. The solution is chilled and the pH thereof adjusted to about 2 with concentrated hydrogen chloride, then taken to dryness on a glass rotary film evaporator. The solids obtained are extracted three times using 200 milliliters of boiling ethanol each time and the combined extracts taken to dryness. The solids are then dissolved in 100 milliliters of water and the solution made basic with sodium carbonate. The solids which precipitate are filtered and dried to yield 6.0 grams of solid. The filtrate is saturated with sodium sulfate and extracted into 100 milliliters of ether to yield an additional 1.5 grams of solids. These solids are admixed and recrystallized from 50 milliliters of water to yield 6.6 grams (79%) of a white solid with melting point 117–118° C.

*Analysis.*—Calculated for $C_3H_3ClN_2$: C, 35.14; H, 2.95; N, 27.32; Cl, 34.59. Found: C, 34.59; H, 2.91; N, 27.10; Cl, 34.43.

EXAMPLE 8

Preparation of 2,4(5)-dibromo-5(4)-chloroimidazole

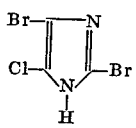

10.0 grams (0.055 moles) of 4(5)-bromo-5(4)-chloroimidazole, prepared in accordance with the procedure of Example 5, is dissolved with stirring in 250 milliliters of water containing 2.2 grams (0.055 mole) of sodium hydroxide. 8.8 grams (0.055 mole) of bromide dissolved in 50 milliliters of chloroform are then added to this solution with stirring over a period of 30 minutes. The temperature of the solution rises to 35° C. and the solution blackens. This solution is adjusted to pH 7 with hydrochloric acid and the volume is made up to 1000 milliliters with water, then boiled with 5.0 grams of carbon and filtered. The carbon treatment is repeated, the filtrate adjusted to pH 2 with concentrated hydrochloric acid and the solution refrigerated overnight. Following refrigeration, the solids are filtered and recrystallized from water containing 5.0 grams of carbon to yield 6.7 grams (47%) of product, melting point 218–220° C.

*Analysis.*—Calculated for $C_3HBr_2ClN_2$: C, 13.84; H, 0.39; N, 10.76; Cl, 13.62; Br, 61.39. Found: C, 14.03; H, 0.48; N, 10.64; Cl, 13.71; Br, 61.18.

EXAMPLE 9

Preparation of 4,5-dichloro-2-phenylazoimidazole

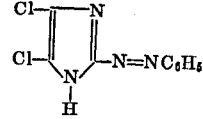

A solution of benzenediazonium chloride is prepared by adding an aqueous potassium nitrite solution (4.26 grams, 0.05 mole) in 25 milliliters of water to a solution of aniline (4.66 grams, 0.05 mole) in 14 milliliters of concentrated hydrochloric acid dissolved in 25 milliliters of ice water at 0–5° C. The diazonium reagent is poured with stirring into an ammoniacal solution of 4,5-dichloroimidazole (6.85 grams, 0.05 mole) in 50 milliliters of 15% ammonium hydroxide, said 4,5-dichloroimidazole being prepared as in Example 1. A pasty yellow precipitate immediately forms. This is collected and air dried to give 12.0 grams (100%) of solid. Purification is effected by reprecipitation from 250 milliliters of 2% sodium hydroxide. After drying in a vacuum desiccator at 45° C., 8.90 grams (74.2%), melting point 163–165° C., is obtained. Proton magnetic resonance spectrum shows five aromatic protons and a broad NH peak centered at 3.7γ which integrates for one proton.

*Analysis.*—Calculated for $C_9H_6Cl_2N_4$: C, 44.84; H, 2.51; N, 23.24; Cl, 29.41. Found: C, 45.07; H, 2.25; N, 23.21; Cl, 29.74.

EXAMPLE 10

The preemergence herbicidal activity of the compounds of the invention is exemplified by the following tests in which the seeds of a variety of monocotyledonous and dicotyledonous plants are separately mixed with potting soil and planted on top of approximately one inch of potting soil in separate pint cups. After planting, the cups are sprayed with the selected aqueous-acetone solution containing the test compound in sufficient quantity to provide the equivalent of 1, 3, 5, 15 or 25 lbs./acre of test compound per cup. The treated cups are then placed on greenhouse benches and cared for in the usual manner, in accordance with greenhouse procedures. Two weeks after treatment, the tests are terminated and each cup is examined and rated according to the defined Herbitoxicity Index given in the table below. The tabulated results of these tests establish the herbicidal proficiency of the test compounds.

Herbitoxicity Index

9 = 100% reduction in stand
9— = 1 or 2 stunted plants remaining
8 = 85—<100% reduction in stand
7 = 70—<85% reduction in stand
6 = 60—<70% reduction in stand
5 = 50—<60% reduction in stand
4 = 40—<50% reduction in stand
3 = 30—<40% reduction in stand
2 = 20—<30% reduction in stand
1 = 10—<20% reduction in stand
0 = no apparent effect
s = severe injury
m = moderate injury
t = trace to slight injury
— = no test Abbreviations for plant species employed in the herbicidal activity tests of Examples 10 and 11 are as follows:

Bi = Bindweed
CT = Canada Thistle
JG = Johnson Grass
Ji = Jimsonweed
Ko = Kochia
La = Lambsquarters
Mu = Mustard
Pi = Pigweed
Ba = Barnyardgrass
Cr = Crabgrass
GF = Green Foxtail
WO = Wild Oats

PREEMERGENCE TABLE

| Structure | Rate, lbs./acre | Plant Species | | | | | | | | |
|---|---|---|---|---|---|---|---|---|---|---|
| | | Ji | Ko | La | Mu | Pi | Ba | Cr | GF | WO |
| Cl—⟨N⟩—H (Cl, N) | 15 | — | 3 | 6 | 6 | 7 | 0 | t | 4 | 0 |
| Cl—⟨N⟩—Br (Cl, N, H) | 1 3 | 9– 9 | 9– 9 | 8 9 | 9 9 | 9– 9 | 0 6 | 5 9– | 3 8 | — |
| Cl—⟨N⟩—Cl (Cl, N, H) | 1 3 5 25 | — — — — | — — 9 9 | 8 9 9 9 | — 4 9 9 | 8 9 9 9 | 0 6 5 9 | 5 8 9– 9 | 2 8 8 9 | — — 8 9 |
| Cl—⟨N⟩—C₂H₅ (Cl, N, H) | 15 | — | 0 | 8 | 9 | 9 | t | m | m | 9 |
| Cl—⟨N⟩—CH₃ (Cl, N, H) | 15 | — | 8 | 8 | 9– | 9– | m | s | 5 | 0 |

EXAMPLE 11

The postemergence herbicidal activity of the compounds of the instant invention is demonstrated by treating a variety of monocotyledonous and dicotyledonous plants with the compounds dispersed in aqueous-acetone mixtures. In the test seedling plants are grown in jiffy flats for about two weeks. The test compounds are dispersed in 50/50 acetone/water mixtures in sufficient quantity to produce concentrations of about 0.5, 2, 2.5, 6 or 10 lbs./acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated in the table below according to the Herbitoxicity Index provided above.

POSTEMERGENCE TABLE

| Structure | Rate, lbs./acre | Plant Species | | | | | | | | | | |
|---|---|---|---|---|---|---|---|---|---|---|---|---|
| | | Bi | CT | JG | Ko | La | Mu | Pi | Ba | Cr | GF | WO |
| Cl—⟨N⟩—H | 6 10 | — 9 | — 9 | — t | 9 9 | 9 9 | 9 9 | s 9 | t — | t — | t — | s — |
| Cl—⟨N⟩·HCl | 10 | m | 9 | m | 9 | 9 | –9 | 9– | m | s | m | s |
| Cl—⟨N⟩—Br | 0.5 2.5 10 | s s — | 9 9 — | 9– 9 — | 9 9 — | 9 9 9 | 9 9 9 | 9 9 9 | m 9 9 | 9 9 9 | s s — | 8 9 9 |
| Cl—⟨N⟩—Cl | 0.5 2 | — — | — — | — — | 9 9 | 9 9 | 9 9 | 9– 9– | 6 7 | 9 9 | 9– 9 | 9– 9– |
| Cl—⟨N⟩—C₂H₅ | 10 | — | — | — | — | 9 | 0 | t | t | t | — | t |

We claim:
1. A compound of the formula:

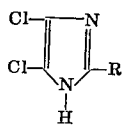

wherein R is selected from the group consisting of hydrogen, halogen, lower alkyl and phenylazo and R′ is selected from the group consisting of hydrogen and halogen, provided that when R is chloro R′ is halogen.

2. A compound as in claim 1 wherein R′ is chloro and R is hydrogen.

3. A compound as in claim 1 wherein R′ is chloro and R is bromo.

4. A compound as in claim 1 wherein R′ and R are each chloro.

5. A compound as in claim 1 wherein R′ and R are each bromo.

6. A process for the preparation of a compound of the formula:

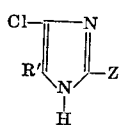

wherein Z is selected from the group consisting of hydrogen, halogen and a lower alkyl, and R′ is selected from the group consisting of hydrogen and halogen which comprises reacting in a basic medium an imidazole of the formula:

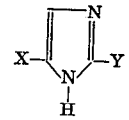

wherein X is selected from the group consisting of hydrogen and halogen and Y is selected from the group consisting of hydrogen and lower alkyl, with an alkali metal hypochlorite, and thereafter adjusting the pH of the reaction mixture to between about 6 and 2.

7. A process according to claim 6 wherein X and Y are hydrogen and the product formed is 4,5-dichloroimidazole.

References Cited

UNITED STATES PATENTS 3,173,907  3/1965  Klingsberg et al. ---- 260—157
3,213,080  10/1965  Bloom et al. ---- 260—157 XR

OTHER REFERENCES

Houben-Weyl: "Methoden Der Organischen Chemie," vol. 5/3, p. 795 (1962).

Koehler: J. Prakt. Chem., 4th series, vol. 21, pp. 50 to 52 (1963).

Pauly et al.: C. A., vol. 22, p. 1157 (1928).

Pyman: J. Chem. Soc. (London), vol. 97, pp. 1814 to 1817 (1925).

FLOYD D. HIGEL, *Primary Examiner.*